W. W. GILES.
Drag-Sawing Machines.
No. 8,782. Reissued July 1, 1879.
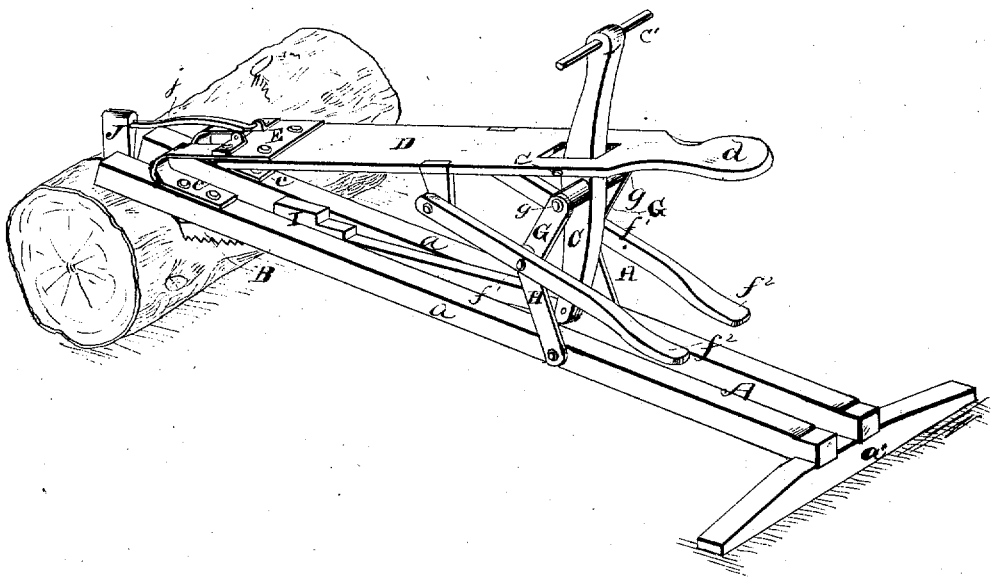
Attest.
W. H. H. Knight
E. Blout
Inventor.
William W. Giles
By E. A. Ellsworth
His Atty.
N. PETERS, PHOTO-LITHOGRAPHER, WASHINGTON, D. C.

UNITED STATES PATENT OFFICE.

WILLIAM W. GILES, OF CINCINNATI, OHIO.

IMPROVEMENT IN DRAG-SAWING MACHINES.

Specification forming part of Letters Patent No. 208,472, dated October 1, 1878; Reissue No. 8,782, dated July 1, 1879; application filed June 5, 1879.

*To all whom it may concern:*

Be it known that I, WILLIAM W. GILES, of Cincinnati, Ohio, formerly of St. Louis, Missouri, have invented a new and useful Improvement in Sawing-Machines, of which the following is a full, clear, and exact description, reference being had to the accompanying drawings, forming part of this specification, in which the figure is a perspective view of a sawing-machine, showing the application of my improvements.

My invention is designed to provide additional means for operating sawing-machines of that class in which the weight and muscular strength of the operator are united to drive the saw, the operator being seated upon a rising and falling seat and grasping the handle of an operating-lever connected to the saw.

To this end the invention consists principally in combining treadles with the operating-lever and the rising and falling seat, for the purpose of increasing the power by which the saw is driven.

It also consists in the means of combining the treadles with the machine.

In the accompanying drawings, A represents a frame, which supports the mechanism for operating the saw. It may be of any suitable form, preferably two bars, *a a*, spaced sufficiently to provide room for the saw and the parts immediately connected therewith, and joined at one end by a cross-bar, *a'*, and at the other end as hereinafter described.

B is the saw, having a reciprocating movement between the bars of the frame. It is attached to an arm, B', which, in turn, is pivoted to the lower end of a lever, C.

D is a lever, connected at its forward end to the frame A, preferably by means of a spring, E, and terminating at its rear end in a seat, *d*. The lever C is pivoted at *c* to the lever D, and its upper end is furnished with a handle, *c'*.

F F are treadles, which, at their forward ends, *f f*, are pivoted to the lever D, and between their ends, at *f' f'*, are pivoted to links G G, which, in turn, are pivoted at *g g* to the lever C. H H are braces, pivoted at their lower ends to the bars *a a*, and at their upper ends to the treadles. The latter may, if desired, be shaped at their rear ends to receive the operator's feet. The spring E also serves, by means of the parts *e e*, to connect the bars *a a* at the forward ends of the latter.

I is a movable weight that can be attached to the saw to produce the requisite pressure thereon, and it can be changed for a lighter or heavier weight if required.

J is a wedge, pivoted, by arms *j*, to the lever D. When desired it can be thrown forward and driven into the kerf to keep the saw from binding in the log, and when thus inserted it serves to hold the machine in place.

In operation, the forward end of the frame is made to rest upon the object to be cut. The operator seats himself on the seat *d*, placing his feet upon the treadles and grasping the handles of the lever C. The weight of the operator causes the seat end of the lever D to descend, and this movement, acting through the lever C and the other parts connected therewith, causes the saw to be drawn backward. The weight of the operator is then thrown onto the treadles, and the power transmitted, through the links G G, to the lever C, and the saw is moved forward again. Both of these movements can be aided by first pushing and drawing upon the upper end of the lever C. By repeating the movements the reciprocation of the saw is continued. The spring E is equivalent to a hinge in connecting the lever D to the frame, and it also aids in lifting the seat end of the lever. It also forms a very durable connection between the lever and frame, for it will be seen that the upper end of the spring is fastened to the upper side of the lever, and the lower end to the upper side of the bars *a a*. This method of connection largely prevents the vibrations of the lever from working it loose, which is apt to be the case when the lever is bolted directly to the frame. By this means the weight of the operator, acting alternately upon the seat *d* and the treadles F F, is sufficient to operate the saw in both directions, and the spring E and handle *c'* are not essential to its working. I prefer to employ them, however, as they materially assist the operation.

The system of leverage, consisting of the treadles F F, links G G, lever C, and braces H H, is especially valuable, because by means thereof the forward movement of the saw is affected under the weight of the operator acting upon the treadles.

If desired, the braces, at their upper ends, may be pivoted at the points *g g*, and may be made adjustable at their points of connection with the treadles.

Having thus described my invention, what I claim is—

1. In a sawing-machine of the class described, the combination of treadles with the vertically-operating lever, the braces, and the rising and falling seat, substantially as described, for the purpose specified.

2. The combination of the treadles and connecting-links, with the operating-lever and the rising and falling seat, substantially as described, for the purpose specified.

3. In a sawing-machine, the combination of the foot-levers pivoted to the seat-lever, with the hand-lever, by means of connecting-links, substantially as described.

4. The combination of the treadles and the links and braces with the operating-lever, the frame, and the rising and falling seat, substantially as described, for the purpose specified.

5. The wedge J, pivoted to its support on the frame to swing into the saw-kerf without lateral movement, substantially as described.

WILLIAM W. GILES.

Witnesses:
E. A. ELLSWORTH,
M. CHURCH.